No. 771,016. PATENTED SEPT. 27, 1904.
A. INGRAM & E. A. STICKNEY.
COMBINED AXLE CUTTER.
APPLICATION FILED MAY 4, 1903.
NO MODEL. 2 SHEETS—SHEET 1.
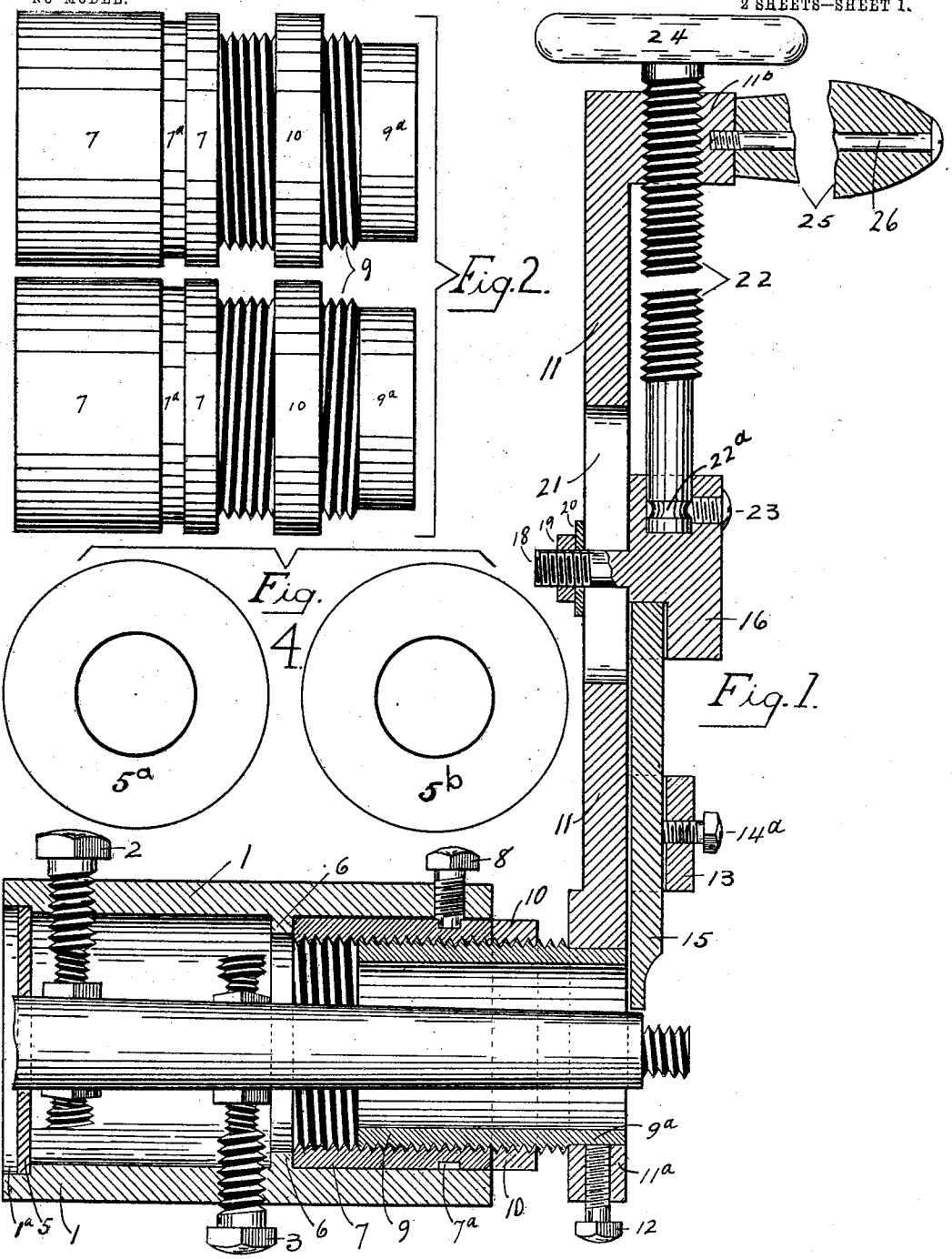
WITNESSES:
J. C. Carpenter
M. J. Kinneburg
INVENTORS
A. Ingram
E. A. Stickney

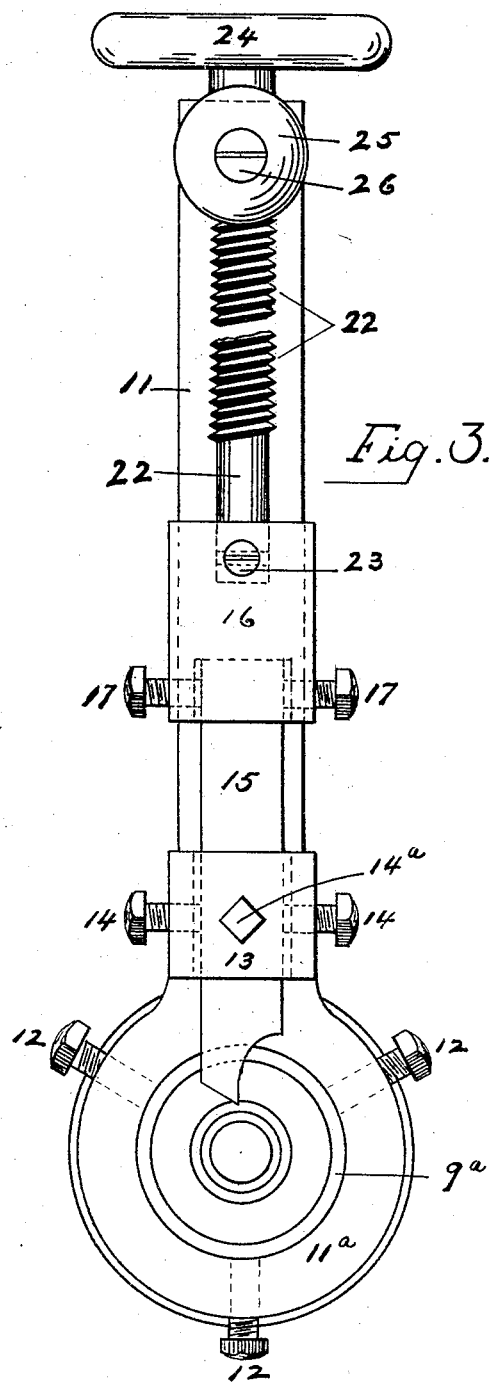

No. 771,016.    Patented September 27, 1904.

UNITED STATES PATENT OFFICE.

ALEXANDER INGRAM AND EDGAR ALLEN STICKNEY, OF SACRAMENTO, CALIFORNIA.

COMBINED AXLE-CUTTER.

SPECIFICATION forming part of Letters Patent No. 771,016, dated September 27, 1904.

Application filed May 4, 1903. Serial No. 155,640. (No model.)

*To all whom it may concern:*

Be it known that we, ALEXANDER INGRAM and EDGAR ALLEN STICKNEY, citizens of the United States, residing at Sacramento, in the county of Sacramento and State of California, have invented a Combined Axle-Cutter, of which the following is a specification.

Our invention relates to certain new and useful improvements in axle-cutters; and the objects of our invention are, first, to provide a simple and inexpensive means for cutting down the shoulders of vehicle-axles to provide for the wear of the boxes; second, to provide for cutting a new thread or cutting back the old thread made necessary by the cutting down of the shoulder, and, third, to provide for cutting off the end of the axle where it protrudes beyond the nut. All of the above operations are performed by the one device without removing the same from the axle or removing the axle from the vehicle-body.

To these ends our invention consists in certain novel features of construction and combination of parts hereinafter more fully described, particularly pointed out in the claim, and illustrated in the accompanying drawings, forming part of this specification, wherein—

Figure 1 is a longitudinal sectional view of an axle-cutter constructed in accordance with this invention. Fig. 2 is a view of the bushings 7 and 9 and lock-nut 10. Fig. 3 is a front view of the axle-cutter with the screws 2 and 3 removed. Fig. 4 is a view of the centering-rings.

Like figures of reference indicate corresponding parts throughout the several views.

1 designates a sleeve or cuff adapted to receive the spindle of an axle and to be secured to the same by radial clamping right-hand threaded screws 2 and 3, which are serially arranged in threaded openings in the sleeve. Said screws 2 and 3 are provided with a squared head on one end and a reduced left-hand threaded portion on the other end with corresponding threaded nuts 4. The object of this arrangement of set-screws and nut is to prevent the end of the set-screw from embedding itself in the axle, which always happens when cup-pointed set-screws are used. One end of the sleeve 1 has an enlarged portion $1^a$ for receiving suitable centering-rings 5 (or $5^a$ $5^b$ having openings of various diameters to provide for axles of different diameters) and is provided also with an internal annular rib 6 integral with the same, forming a bearing for the internally-threaded bushing 7, having an annular groove $7^a$ for receiving the set-screw 8. Said set-screw 8 holds the bushing 7 against lateral movement and, when desired, against rotary motion, as more fully set forth hereinafter. Within this bushing 7 is an exteriorly-threaded bushing 9, having a lock-nut 10 and provided at its outer end with a reduced portion $9^a$ for receiving the circular portion $11^a$ of the crank 11. Said circular portion is secured to the bushing 9 by the set-screws 12.

The combination of bushings 7 and 9 and lock-nut 10, as mentioned above, is provided in pairs, one combination having left-hand threaded bushings and the other right-hand threaded bushings, and a number of pairs of such combinations are provided with threaded bushings of different pitches corresponding with the pitches of threads upon vehicle-axles of various diameters. Upon the crank 11 is a tool-guide 13, having set-screws 14 and $14^a$ for adjustably holding a tool 15 in cutting position, a tool-holder 16, having set-screws 17 (see Fig. 3) for securely holding the cutting-tools, and a bolt 18, integral with 16 and provided with a nut 19 and washer 20 for adjustably holding the tool-holder in position in the guide-slot 21, a threaded shaft 22, operating in the nut $11^b$ and provided at one end with an annular groove $22^a$ for receiving the retaining-screw 23 and at the other end with a hand feed-wheel 24, and, finally, a handle 25, secured to said crank by the threaded bolt 26.

The operation of our improved combined axle-cutter is as follows: Having selected a combination of bushings and lock-nut (see Fig. 2) with threads corresponding in pitch and kind to the pitch and kind of the thread on the axle to be cut, place the same in the end of the sleeve 1, as indicated in Fig. 1. Firmly secure the crank 11 to the bushing 9 by the set-screws 12. Select and put on the axle a suitable centering-ring 5. Slip the sleeve 1 with accompanying parts over the axle and center it by means of the several screws 2 and 3, the centering-ring 5 serving as a guide. Secure the bushing 7 against rotation by means of the set-screw 8 and revolve the crank 11 until the cutting-tool 15 is opposite the point on the axle where it is desired it shall be cut. By means of a spanner-wrench (or other suitable means) turn the lock-nut 10 firmly against the bushing 7, which will bind the two bushings 7 and 9 together as one and loosen the set-screw 8 until the bushing can revolve freely, but not move laterally. It is evident from this arrangement that when the crank 11 is revolved the cutting-tool will not move laterally, but will cut down the axle at the desired point as it is fed against the work by the hand-wheel 24, which is under the control of the operator. Having cut down the shoulder as far as desired, tighten the set-screw 8 until it holds the bushing 7 against rotation. Turn the lock-nut 10 back out of the way, leaving a considerable space between it and the bushing 7, as illustrated in Fig. 2. Insert a cutting-tool having a V cutting-point in place of the straight cutting tool 15, and adjust the same until the point of the V-tool follows the depressions in the threads on the axle. On account of this peculiar arrangement of bushings it is manifest that the tool will advance one thread with each revolution of the crank and will form a thread on the axle corresponding with the thread on the bushing, consequently with the thread on the axle. It is manifestly evident also that this cutting-tool will cut a new thread on an axle having no thread or will cut down an old thread which has become worn, so that it will not hold a nut. (In this case a new nut must be made having a threaded opening of proper size to fit the new thread on the axle.) To cut off the end of the axle, "run" the bushing 9 out until the point of the cutting-tool 15 (which has been reinserted) is opposite the point to be cut off, turn the lock-nut 10 firmly against the bushing 7, loosen the set-screw 8 to allow the bushing 7 to revolve freely, but not to move laterally, and proceed as in cutting down the shoulder until the point of the axle is entirely cut off.

It will be noted that various changes may be made in the details of construction without departing from the principle or sacrificing any of the advantages of this invention.

We are aware that prior to our invention axle-cutters have been made having a sleeve and operating in conjunction with cutting-knives. We therefore do not claim such a combination broadly; but What we do claim as our invention, and desire by Letters Patent to secure, is—

In an axle cutting and threading device of the character described, the combination with a sleeve adapted to receive an axle and provided with set-screws for clamping it on the same, and having an internal annular rib forming a bearing for the bushing 7, of an internally-threaded bushing 7 mounted in the outer end of said sleeve 1 and having an annular groove $7^a$ for receiving a set-screw 8 passing through a threaded perforation in the sleeve, an exteriorly-threaded bushing 9 screw-threaded in said bushing 7, a crank rigidly fixed to the outer reduced portion of said bushing 9 by a series of set-screws 12, a radial adjustable cutting or threading tool carried by said crank, a lock-nut 10 for binding the bushings 7 and 9 together when cutting down the shoulder or cutting off the end of an axle, and a set-screw 8 for binding the bushing 7 to the sleeve 1 when threading the spindle of an axle, all substantially as shown and described.

In witness whereof we have signed our names to this specification in the presence of two subscribing witnesses.

ALEX. INGRAM.
  EDGAR ALLEN STICKNEY.

Witnesses:
  Chas. A. McConnell,
  A. C. Cheney.